United States Patent [19]

Rudbeck

[11] 4,049,312
[45] Sept. 20, 1977

[54] STORAGE ARRANGEMENT FOR VEHICLES

[75] Inventor: Per-Olof Bertil Rudbeck, Katrineholm, Sweden

[73] Assignee: Saab-Scania, Scania Division, Sweden

[21] Appl. No.: 591,529

[22] Filed: June 30, 1975

[30] Foreign Application Priority Data

July 8, 1974 Sweden ............................. 74089343

[51] Int. Cl.$^2$ ..................... B62D 25/20; B60R 9/00
[52] U.S. Cl. ................... 296/28 A; 224/42.41; 224/42.42 R; 296/37.1; 296/37.14
[58] Field of Search ............ 296/37 R, 23 MC, 24 R, 296/28 A, 28 AB, 37.1, 37.14; 224/42.32, 42.41, 42.46 R, 42.42 R

[56] References Cited

U.S. PATENT DOCUMENTS

| | | | |
|---|---|---|---|
| 1,230,436 | 6/1917 | Schluer | 296/37 R X |
| 1,381,378 | 6/1921 | Wilkins | 296/24 R |
| 1,453,362 | 5/1923 | Loveland | 224/42.41 X |
| 1,473,319 | 11/1923 | Ray | 224/42.32 |
| 1,489,948 | 4/1924 | Kosney | 224/42.41 |
| 1,674,394 | 6/1928 | Hansen | 296/28 A |
| 2,157,793 | 5/1939 | Lang | 296/24 R X |
| 2,639,187 | 5/1953 | Grumbache | 296/37 R |
| 3,029,102 | 4/1962 | Mueller | 296/28 AB |
| 3,722,946 | 3/1973 | Cary | 224/42.42 R |
| 3,764,048 | 10/1973 | Gore | 296/37 R X |
| 3,778,011 | 12/1973 | Cannon | 224/42.41 X |

FOREIGN PATENT DOCUMENTS

| | | | |
|---|---|---|---|
| 1,137,741 | 6/1957 | France | 296/37 R |
| 329,680 | 5/1930 | United Kingdom | 296/37 R |

Primary Examiner—Robert J. Spar
Assistant Examiner—Winston H. Douglas
Attorney, Agent, or Firm—Schiller & Pandiscio

[57] ABSTRACT

The invention relates to a storage arrangement for the carriage of luggage in buses and other vehicles. In the past such space has usually been provided beneath the chassis of the vehicle and has been provided by complete floor and rear walls and front openable flaps forming part of the vehicle body. This presents a disadvantage since it is necessary to decide the size of the storage space during the planning and manufacture of the vehicle. The invention provides an arrangement whereby the designated storage space can be used to a greater or lesser extent by the provision of an appropriate number of box shaped insert units having detachable attachment means associated therewith. Thus, each box shaped insert unit, which defines at least one open side, is located so as to be closed by its openable flap which, in the closed position, conforms to the external shape of the vehicle body. Portions of the designated space not accommodating insert units may be covered by cover plates. The openable flaps may be provided on the vehicle itself, or as lids attached to the insert units.

6 Claims, 4 Drawing Figures

STORAGE ARRANGEMENT FOR VEHICLES

The present invention relates to storage arrangements for vehicles, and more particularly to the provision of variable storage space for the transportation of goods and luggage in buses and other vehicles having, for this purpose, available space which is accessible from outside the vehicle through at least one openable flap.

In buses, it is known to utilize as a luggage compartment the space found beneath the chassis of a vehicle and between the wheel axles. This luggage compartment normally comprises a complete floor and front and rear walls firmly arranged in the body or coachwork of the vehicle. The side walls of the luggage compartment normally comprise flaps which are incorporated in the lower portions of the side-walls of the vehicle body and which can be opened from both sides of the vehicle. With such a luggage compartment it is necessary to decide the size of said compartment in the planning and manufacture of the vehicle and the compartment cannot be readily adapted to meet varying storage requirements. This renders a vehicle fitted with such a compartment uneconomical and presents disadvantages.

An object of the present invention is to provide a storage arrangement for vehicles in which the storage or luggage space can be adapted to meet varying requirements.

Accordingly, this invention consists in a storage arrangement for vehicles of the kind having storage space which is accessible from outside the vehicle through at least one openable flap, wherein the arrangement comprises at least one box-shaped insert unit which has at least one open side, and wherein each said unit is located in said storage space and supported therein by detachable attachment means or bearing means in a manner such that the open side of the unit can be closed by the openable flap which, in its closed position, conforms to the external shape of said vehicle body, the usable storage space being determined by the number of insert units provided.

As will readily be understood, the scope of the invention also embraces a vehicle which has one or more such insert storage units placed therein.

In the case of a vehicle having openable vehicle-body flaps arranged side by side in uniform spaced relationship, such as in a system of modules, each insert unit is conveniently provided with an openable flap which conforms with said modular system or vehicle-body flaps.

Each insert unit may be removably attached to the underneath of the vehicle by removable securing devices or, alternatively, may be provided with support means which are intended to cooperate with guides arranged on the underneath of the vehicle. This latter alternative enables, for example, transport containers to be readily accommodated in the storage space, so that the loading and off-loading of baggage, for example, can be made more efficient and, in this respect, so that waiting times at air terminals, bus stations and railway stations can be greatly reduced.

Embodiments of the invention will now be described by way of example with reference to the accompanying drawings, in which FIG. 1 shows diagrammatically and in perspective a box-like storage unit mounted on a vehicle.

In the Figures, only those portions of a conventional vehicle body are shown which can be of importance in obtaining an understanding of the scope of the invention.

Figure 1:
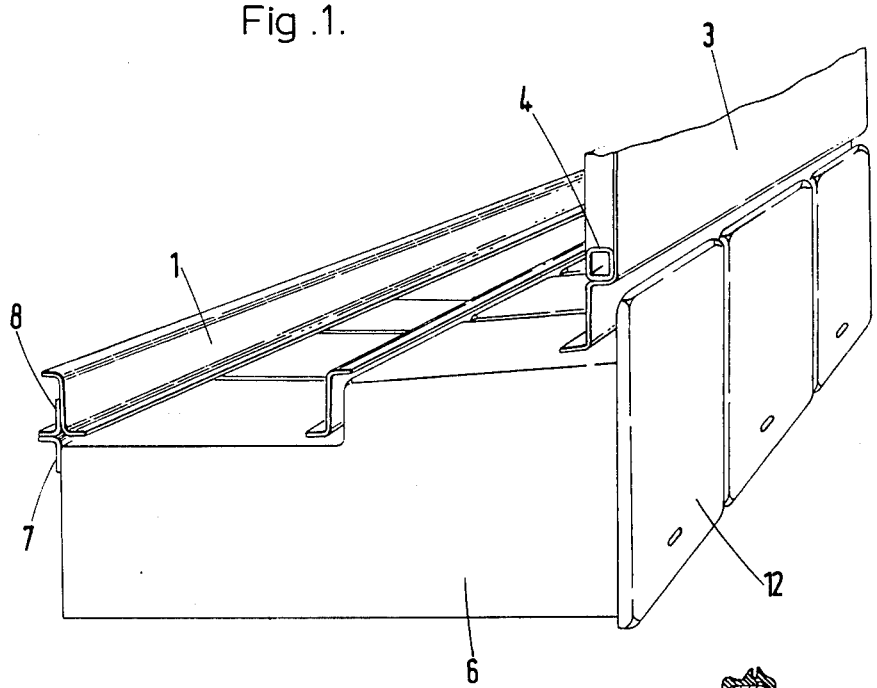
Figure 2:
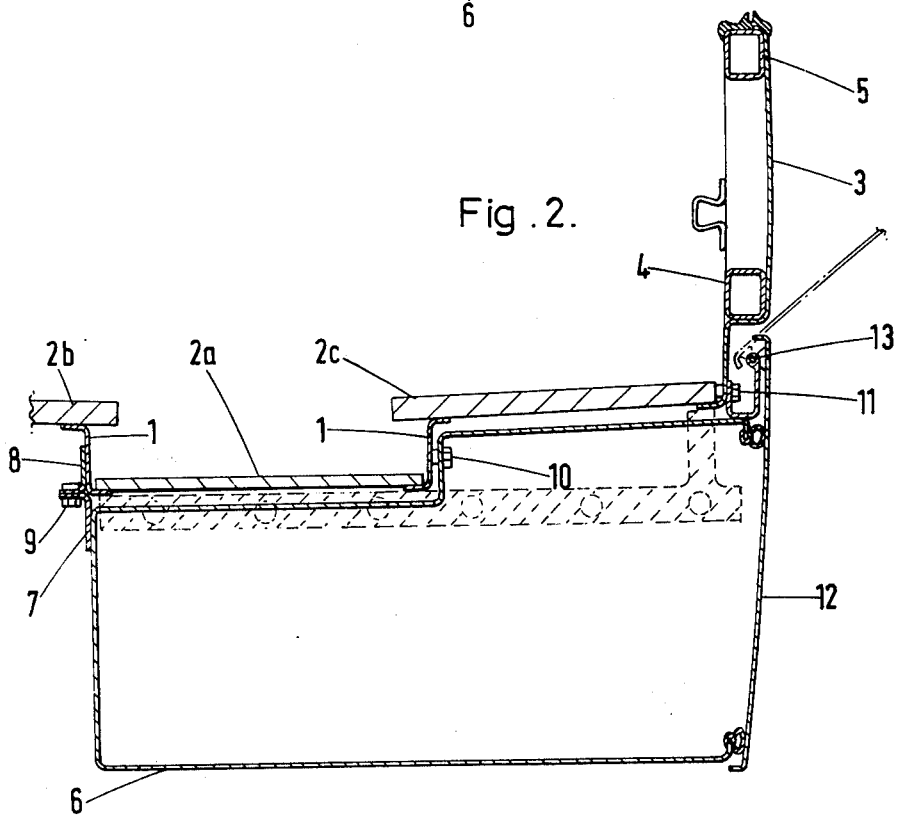
FIG. 2 is a side view in cross-section of the embodiment shown in FIG. 1.

FIGS. 1 and 2 show diagrammatically a frame structure which forms part of a vehicle body and which comprises supporting elements for the floor 2 of the vehicle. The frame structure comprises two longitudinally extending centre beams 1, which together with angled supports provided at the side of the vehicle body are adapted to support the floor 2 which, as shown, comprises a number of floor components 2a – 2c. The angled supports comprise parts of respective side-walls 3 of the vehicle body. The vehicle body is constructed in a conventional manner and, for the purpose of describing the invention, only the lower part of one longitudinal side wall 3 has been shown in the Figures, said sidewall comprising in a conventional manner two longitudinally extending tubular beams 4, 5.

The space beneath the frame beams 1 between the side walls 3 of the vehicle body is used as luggage space. For this purpose one or more box-like structure 6 are removably mounted in said space. Each box 6 may be provided with an open side, which lies substantially in the same vertical plane as the side wall 3 of the vehicle body, said open side being coverable by an openable flap 12 which, when closed, aligns with and thereby effectively forms part of a respective side-wall of the vehicle body. The box 6 exemplified in FIGS. 1 or 2 is of such construction that its upper wall lies adjacent the underneath of the floor 2, and its under side is substantially planar and is located at a distance beneath the frame beams 1 such that the vehicle obtains the desired road clearance. The box 6 shown in the drawing extends from one side of the vehicle to the frame beam 1 located furthest from said side, although, of course, it is also possible for the box to extend a shorter or a longer distance in the transverse direction of the vehicle.

Each box 6 has the form of an insertable storage unit and is provided with means which enable the box to be removably attached to a vehicle. In the illustrated embodiment, these means comprise a bracket structure 7 arranged on the inner end wall of the box 6 and a number of screws or bolts 9 by means of which the box is attached internally to a bracket structure 8 mounted on one of said beams 1, and a number of screws or bolts 10 for attaching the box 6 to the other of said beams. In this way, each box 6 can be readily installed and removed and the desired number of boxes can be readily inserted in the space available, said number being dependent upon the use to which the vehicle is to be put.

The attachment means for the boxes 6 can, of course, have any suitable form, and it is also possible to provide each unit with means which cooperate with transversely extending guides (as shown in phantom in FIG. 2) in the vehicle, on which the boxes may be displaceably mounted. Such guides should also be provided with locking means for locking the boxes in their inserted position, said means being capable of being manually released when removing the boxes. Such an arrangement affords several advantages. Thus, it is possible to change the boxes in the vehicle quickly for other, pre-packed boxes. Further, the number of boxes can be readily adjusted to the amount of baggage space actually required. This is particularly true when the openable flaps provided in the vehicle body are arranged side by side in the manner of modules. In such cases, the boxes must be constructed to conform to the modular flap arrangement.

In the exemplary embodiment of FIGS. 1 and 2, the openable flaps 12 are mounted for pivotable movement about an upper pivot shaft 13 which, via a connecting means, is attached to the respective side-wall 3 of the vehicle and the floor 2 by means of a number of screws or bolts 11. The boxes 6 may also be provided with openable flaps which are intended to replace the flaps 12 attached to the vehicle body, the size and design of the box-flaps being adapted to the vehicle. This applies in particular to buses in which provision is made in the sides of the bus for a modular system of uniformly distributed flap openings. This is particularly true when the openable flaps provided in the vehicle body are arranged side by side in the manner of modules. In such cases, the boxes must be constructed to conform to the modular flap arrangement.

As indicated in the aforegoing, all of the available storage space may not be required for receiving the insertable storage units.

Figure 3:
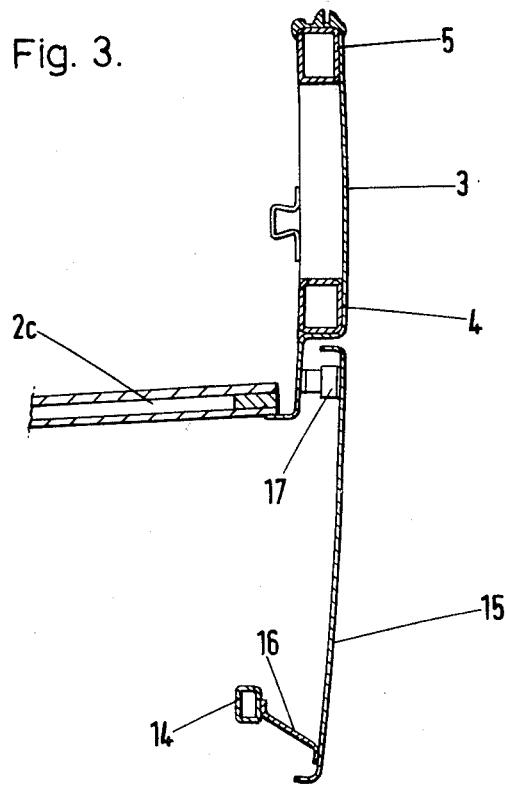
FIG. 3 is a part sectional view through the lower portion of one side of the vehicle and shows a mountable flap arranged thereon.
Figure 4:
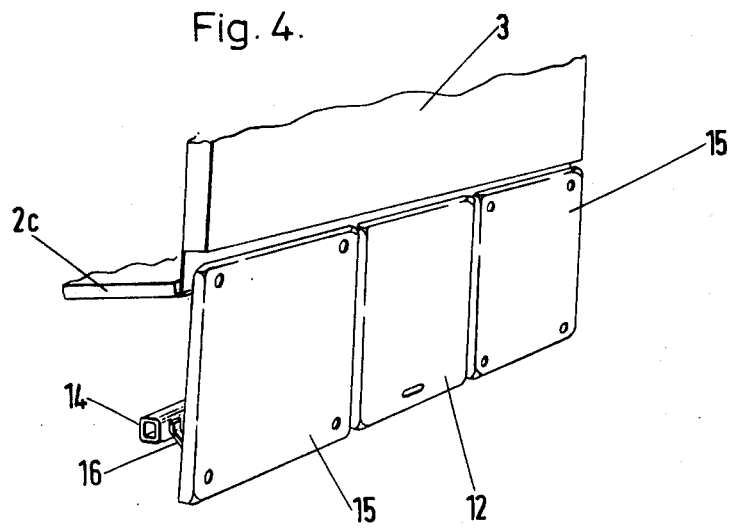
FIG. 4 is a perspective view of part of one side of a vehicle having lower flaps arranged in a modular system.

FIG. 3 shows a case where part of the available storage space, in the longitudinal direction thereof, has no box placed therein. In this case a plate 15 covering the space is attached to the vehicle by means of removable attachment means (not shown), such as screws or bolts. The upper portion of the plate 15 is attached, via bracket structures 17, to the vehicle frame or to the lower portion of the side wall 3 of the vehicle body, and the lower portion of said plate 15 is connected by connecting means 16 to a support frame 14 attached to the vehicle frame by means of stays (not shown). The support frame 14 replaces the box 6 and the connecting means 16 attached to said frame are designed for resilient deformation when subjected to lateral loads. The support frame 14 is dimensioned to act as an under-drive protector, and, since the connecting means 16 is sprung and/or resiliantly deformable, a vehicle thus equiped is able to withstand minor collisions from the side without other portions of the vehicle being damaged.

Although the embodiment described with reference to FIGS. 1 and 2 has the openable flap 12 hingedly mounted on the vehicle body, it will be readily understood that the boxes themselves could be provided with the openable flaps.

I claim:

1. In a bus-type motor vehicle of the kind having storage space which is accessible from outside the vehicle through at least one pivotal openable flap, an improved storage compartment which comprises:
   a. at least one insert unit, said unit (i) being generally box shaped and (ii) having at least one open side,
   b. attachment means associated with each said unit for removably supporting each unit in said storage space, said attachment means (i) being detachable, from said vehicle, and (ii) being arranged so as to locate and readily removably support each unit beneath the floor of said vehicle with said open side thereof lying in a place coinciding with one of the side walls of the vehicle body so that its open side will be closed by a pivotal openable flap, when the latter is in a closed position,
   c. the number of insert units provided determining the usable storage space of the compartment and having dimensions chosen to conform to a modular system,
   d. said at least one openable flap being arranged so as to conform to the external shape of said vehicle body when said flap is in its closed position,
   e. said openable flap being arranged in said modular system,
   f. any portion of said space designated for said insert units but not occupied by said units being covered by at least one cover plate which is (i) fixedly located and (ii) covering said portion, said cover plate being arranged in said modular system so as to conform to the external shape of said vehicle body.

2. In a motor vehicle according to claim 1, wherein said at least one openable flap is pivotally mounted on the body of the vehicle.

3. In a motor vehicle according to claim 1, wherein said openable flaps are arranged in a modular system, and wherein said insert units have dimensions chosen to conform to said modular system.

4. In a motor vehicle according to claim 1, wherein said attachment means comprise guide means for each insert unit extending transversely of the vehicle, and each said unit being displaceably supported by said guide means.

5. In a motor vehicle according to claim 1, wherein said at least one openable flap is pivotably mounted on the insert unit.

6. In a motor vehicle according to claim 1, wherein the dimensions of said cover plates conform to said modular system.

* * * * *